United States Patent
Yamana et al.

(12)

(10) Patent No.: US 6,284,853 B1
(45) Date of Patent: Sep. 4, 2001

(54) COPOLYMER AND STAINPROOFING AGENT CONTAINING THE SAME

(75) Inventors: Masayuki Yamana; Ikuo Yamamoto; Norihito Otsuki; Teruyuki Fukuda, all of Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/015,764

(22) Filed: Jan. 29, 1998

(30) Foreign Application Priority Data

Jan. 29, 1997 (JP) .................................... 9-015116

(51) Int. Cl.$^7$ ...................................... C08F 18/20
(52) U.S. Cl. .................. 526/245; 526/309; 526/310; 526/248; 524/805; 428/395
(58) Field of Search .................... 526/310, 245, 526/309, 248; 524/805; 428/395

(56) References Cited

U.S. PATENT DOCUMENTS

| | | | |
|---|---|---|---|
| 5,100,954 | * 3/1992 | Ito et al. | 524/805 |
| 5,149,754 | 9/1992 | Green et al. | 526/309 |
| 5,578,688 | * 11/1996 | Ito et al. | 526/245 |

FOREIGN PATENT DOCUMENTS

| | | | |
|---|---|---|---|
| 2151-35 | * 2/1973 | (DE) | . |
| 2247111 | * 4/1974 | (DE) | . |
| B6317109 | 10/1981 | (JP) | . |
| B355515 | 6/1984 | (JP) | . |
| B355516 | 6/1984 | (JP) | . |

* cited by examiner

Primary Examiner—David W. Wu
Assistant Examiner—Tanya Zalukaeva
(74) Attorney, Agent, or Firm—Birch, Stewart, Kolasch & Birch, LLP

(57) ABSTRACT

The present invention provides a copolymer whose durability on cleaning is improved while maintaining good water- and oil-repellency. Disclosed is a copolymer having:

(i) a fluoroalkyl group,
(ii) a urethane or urea linkage, and
(iii) a functional group selected from the group consisting of a carboxyl group, a carboxylic anhydride group, an epoxy group, a phosphoric group, an alkoxysilane group, a imine group, a sulfonic group, an amino group, an isocyanate group and a chlorine atom, and a stain-proof agent containing the copolymer as an active component.

15 Claims, No Drawings

COPOLYMER AND STAINPROOFING AGENT CONTAINING THE SAME

FIELD OF THE INVENTION

The present invention relates to a copolymer, a composition containing the copolymer, and a stainproofing agent containing the copolymer as an active component.

RELATED ART

In order to impart the water repellency, oil repellency and stainproofing properties to a textile (e.g. carpet), various stainproofing agents have hitherto been suggested. Japanese Patent Kokoku Publication Nos. 17109/1988, 55515/1991 and 55516/1991 disclose that a stainproofing agent comprising a urethane compound and a specific copolymer blend imparts the water repellency, oil repellency and stainproofing properties. However, the water repellency, oil repellency and stainproofing properties after cleaning are insufficient when using these copolymers.

U.S. Patent No. 5,149,754 discloses a stainproofing agent composition containing a monomer having a carboxyl group or a carboxylic anhydride group. However, this composition can not impart sufficient water repellency and oil repellency after cleaning.

As described above, various water- and oil-repellents have hitherto been suggested, but those where sufficient water repellency, oil repellency and stainproofing properties are maintained before and after cleaning are yet to be obtained.

SUMMARY OF THE INVENTION

An object of the present invention is to provide a copolymer which imparts good durability on cleaning while maintaining good water- and oil-repellency.

The present invention provides a copolymer (A) having:
(i) a fluoroalkyl group,
(ii) a urethane or urea linkage, and
(iii) a functional group selected from the group consisting of a carboxyl group, a carboxylic anhydride group, an epoxy group, a phosphoric group, an alkoxysilane group, an imine group, a sulfonic group, an amino group, an isocyanate group and a chlorine atom.

The present invention also provides a composition (B) comprising the above copolymer (A) and an acrylic copolymer containing no fluorine.

The present invention also provides a stainproofing agent comprising:
(a) (i) the copolymer (A) alone, or (ii) a mixture of the copolymer (A) and the copolymer (B), and
(b) a solvent.

DETAILED DESCRIPTION OF THE INVENTION

The copolymer (A) of the present invention can be obtained by copolymerizing:
(I) a monomer which has a fluoroalkyl group and optionally has a urethane or urea linkage,
(II) a monomer which contains no fluorine and has at least one urethane or urea linkage and one carbon-carbon double bond, and
(III) a monomer which has a functional group selected from the group consisting of a carboxyl group, a carboxylic anhydride group, an epoxy group, a phosphoric group, an alkoxysilane group, an imine group, a sulfonic group, an amino group, an isocyanate group and a blocked adduct thereof and a chlorine atom and has a carbon-carbon double bond.

The monomer (I) and monomer (II) may be a single monomer having (a) a fluoroalkyl group, (b) a urethane or urea linkage and (c) a carbon-carbon double bond.

The fluoroalkyl group in the monomer (I) is preferably a perfluoroalkyl group.

The monomer (I) having a fluoroalkyl group may be a (meth)acrylate ester having a $C_{3-21}$ fluoroalkyl group. The monomer (I) may be a compound represented by the general formula:

$$Rf-R^1-OCOC(R^2)=CH_2$$

wherein Rf is a linear or branched fluoroalkyl group having 3 to 20 carbon atoms; $R^1$ is a linear or branched alkylene group having 1 to 20 carbon atoms, a group of $-CON(R^3)-R^4-$, a group of $-SO_2N(R^3)R^4-$ or a group of $-CH_2CH(OR^5)CH_2-$ ($R^3$ is an alkyl group having 1 to 10 carbon atoms; $R^4$ is a linear or branched alkylene group having 1 to 10 carbon atoms; and $R^5$ is a hydrogen atom or an acyl group having 1 to 10 carbon atoms); and $R^2$ is a hydrogen atom or a methyl group.

Examples of the monomer (I) having a fluoroalkyl group are as follows:

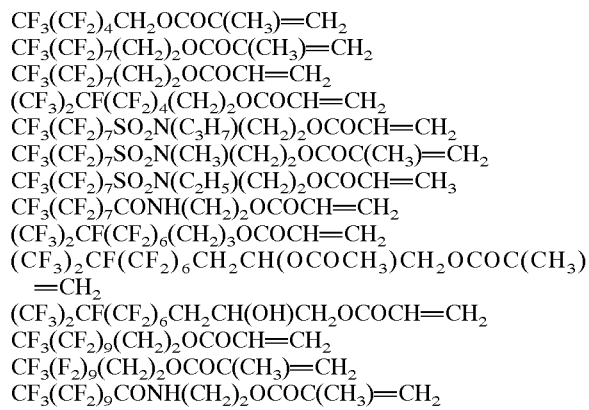

$CF_3(CF_2)_4CH_2OCOC(CH_3)=CH_2$
$CF_3(CF_2)_7(CH_2)_2OCOC(CH_3)=CH_2$
$CF_3(CF_2)_7(CH_2)_2OCOCH=CH_2$
$(CF_3)_2CF(CF_2)_4(CH_2)_2OCOCH=CH_2$
$CF_3(CF_2)_7SO_2N(C_3H_7)(CH_2)_2OCOCH=CH_2$
$CF_3(CF_2)_7SO_2N(CH_3)(CH_2)_2OCOC(CH_3)=CH_2$
$CF_3(CF_2)_7SO_2N(C_2H_5)(CH_2)_2OCOCH=CH_3$
$CF_3(CF_2)_7CONH(CH_2)_2OCOCH=CH_2$
$(CF_3)_2CF(CF_2)_6(CH_2)_3OCOCH=CH_2$
$(CF_3)_2CF(CF_2)_6CH_2CH(OCOCH_3)CH_2OCOC(CH_3)=CH_2$
$(CF_3)_2CF(CF_2)_6CH_2CH(OH)CH_2OCOCH=CH_2$
$CF_3(CF_2)_9(CH_2)_2OCOCH=CH_2$
$CF_3(F_2)_9(CH_2)_2OCOC(CH_3)=CH_2$
$CF_3(CF_2)_9CONH(CH_2)_2OCOC(CH_3)=CH_2$

The monomer (I) having a urethane or urea linkage and a fluoroalkyl group may be represented by the general formula:

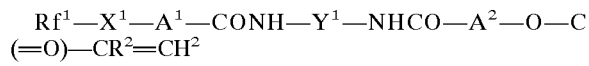

$$Rf^1-X^1-A^1-CONH-Y^1-NHCO-A^2-O-C(=O)-CR^2=CH^2$$

wherein $Rf^1$ is a fluoroalkyl group having 4 to 16 carbon atoms; $X^1$ is $-R^6-$, $-CON(R^3)-R^4-$ or $-SO_2N(R^3)-R^4-$ [$R^6$ is an alkylene (for example, $C_1$ to $C_{30}$) group; $R^3$ is a hydrogen atom or a lower (for example, $C_1$ to $C_{10}$) alkyl group; $R^4$ is an alkylene (for example, $C_1$ to $C_{30}$) group]; $A^1$ is $-O-$, $-S-$ or $-N(R^3)-$ [$R^3$ is a hydrogen atom or a lower (for example, $C_1$ to $C_{10}$) alkyl group]; $Y^1$ is a residue wherein isocyanate is removed from an aromatic or alicyclic diisocyanate; $A^2$ is a divalent organic group capable of having 2 to 9 carbon atoms and at least one oxygen atom; and $R^2$ is a hydrogen atom or a methyl group.

Specific examples of the monomer (I) having a urethane or urea linkage and a fluoroalkyl group are as follows.

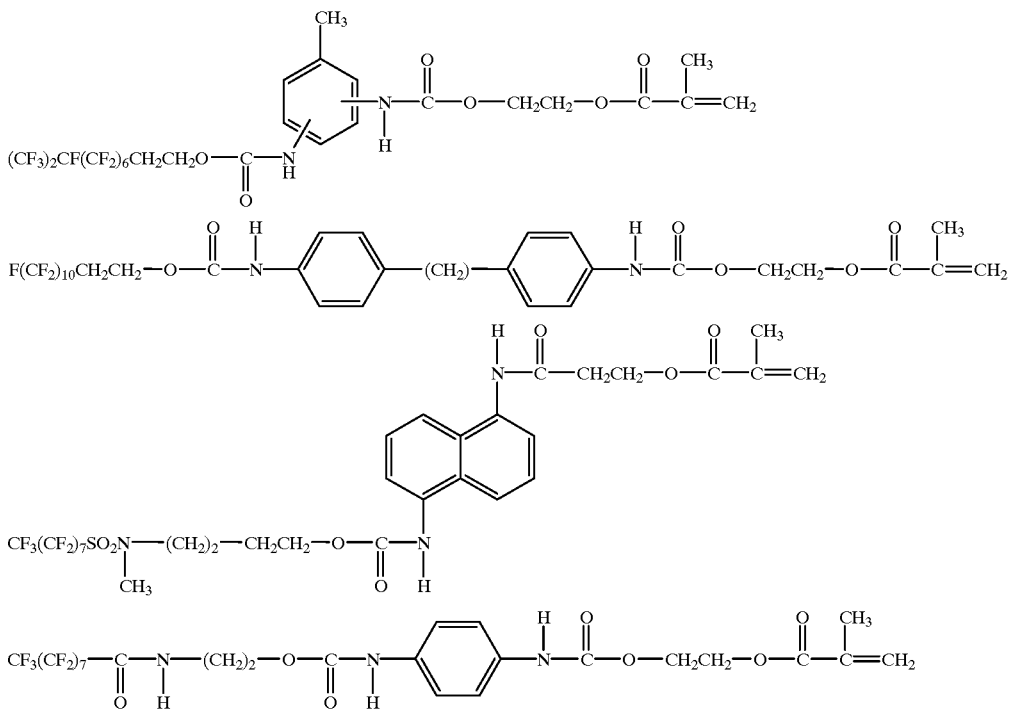

The monomer (II) which contains no fluorine and has at least one urethane or urea linkage and one carbon-carbon double bond may be obtained by reacting:

(A) a compound having at least two isocyanate groups,
(B) a compound having one carbon-carbon double bond and at least one hydroxyl or amino group, and
(C) a compound having one hydroxyl or amino group.

Examples of the compound (A) are as follows.

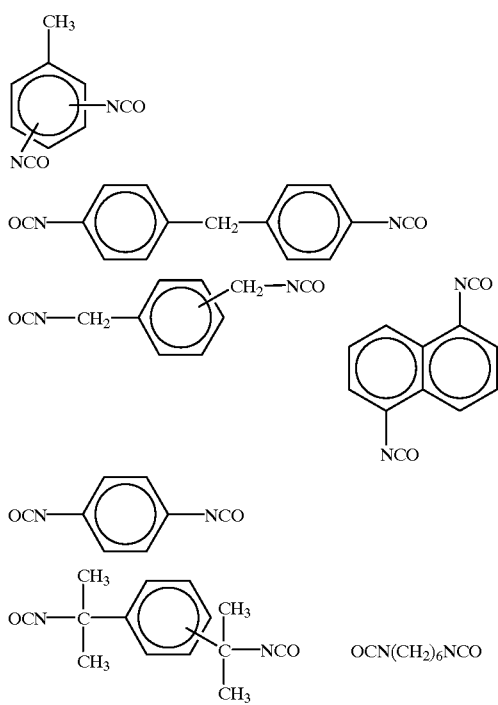

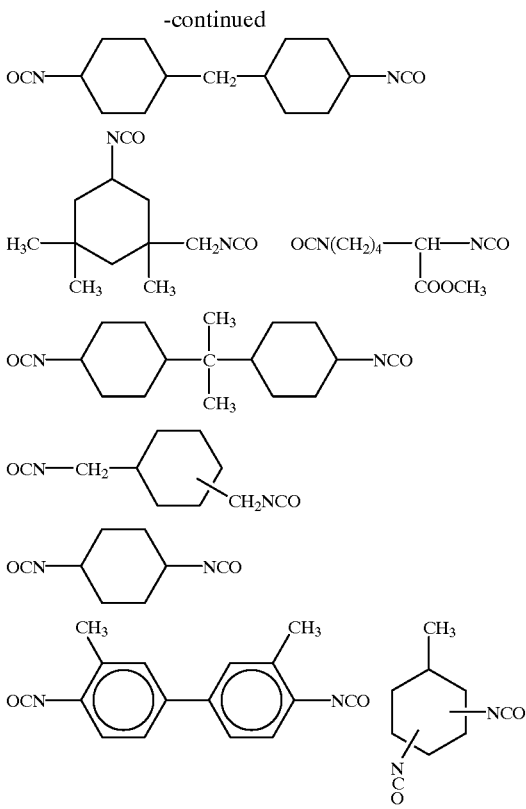

The compound (A) is preferably a diisocyanate. However, a triisocyanate and a polyisocyanate having at least four isocyanate groups can also be used in the reaction.

For example, a trimer of the diisocyanate, polymeric MDI (diphenylmethane diisocyanate) and an adduct between a polyhydric alcohol (e.g. trimethylolpropane, trimethylolopropane and glycerin) and a diisocyanate can also be used in the reaction.
Examples of the triisocyanate and polyisocyanate are as follows.
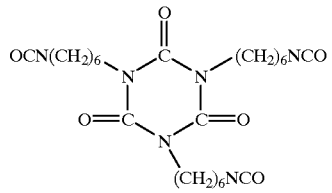
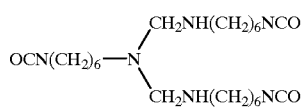
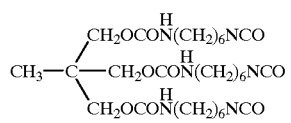
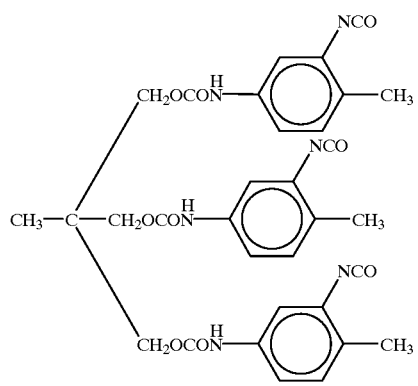
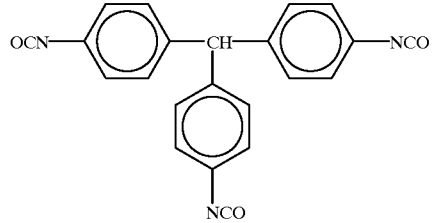
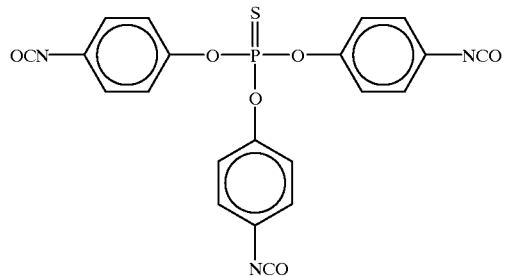
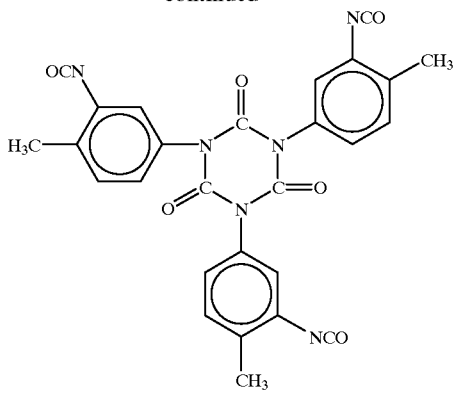
The compound (B) may be, for example, a compound represented by the formula:
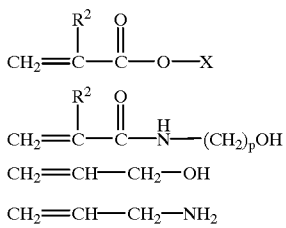
wherein $R^2$ is a hydrogen atom or a methyl group; p is from 0 to 300; and X is as follows.
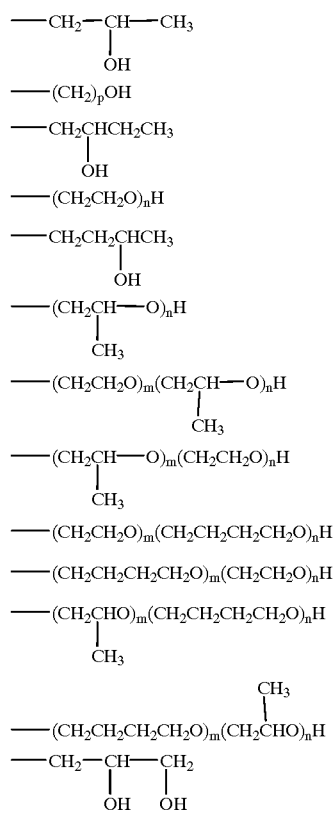

-continued

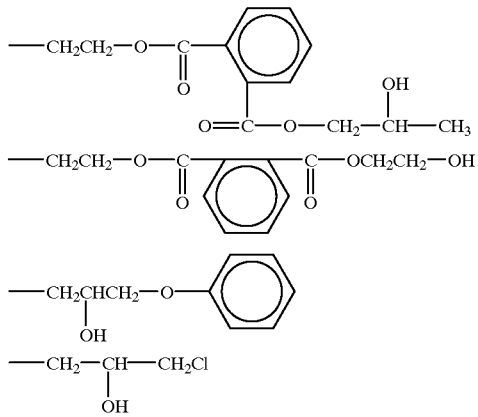

wherein p, m and n each is an integer of 1 to 300.

The compound (C) may be a compound represented by the formula:

or

wherein $R^7$ and $R^8$ are the same or different and each is a $C_1$–$C_{22}$ alkyl group, which may contains a hetero atom, and an aromatic or alicyclic group. Preferable groups for $R^7$ and $R^8$ include $C_8H_{17}$, $C_{17}H_{35}$, $C_3H_9$ and cyclohexyl.

Examples of the compound (C) are butyl alcohol, 2-ethylhexyl alcohol, lauryl alcohol, stearyl alcohol, oleyl alcohol, benzyl alcohol, cyclohexyl alcohol, 2-ethylhexylamine and stearylamine.

When the compound (A) is a diisocyanate, the monomer (II) can be obtained by reacting 1 mol of the compound (B) and 1 mol of the compound (C) with 1 mol of the compound (A). When the compound (A) is a triisocyanate, the monomer (II) can be obtained by reacting 1 mol of the compound (B) and 2 mol of the compound (C) with 1 mol of the compound (A).

Both structure units (I) and (II) may be derived from a single monomer, not two monomers.

The monomer constituting the structure unit (III) 5may be vinyl chloride ($CH_2$=CHCl) or a compound represented by the general formula:

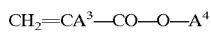

wherein $A^3$ is a hydrogen atom, an alkyl (for example, $C_1$–$C_{10}$)group or a group of —$CH_2COOH$; and $A^4$ is a hydrogen atom, —$A^5$—$X^2$ ($A^5$ is a direct bond or an alkylene (for example, $C_1$–$C_{30}$) group; and $X^2$ is a carboxyl group, an epoxy group, a phosphoric group, an alkoxysilane group, an amino group or a residue wherein one hydrogen is removed from one carboxyl group of dicarboxylic acid), or —$CH_2$—$C(OA^6)H$—$CH_2$—Cl ($A^6$ is a hydrogen atom or an acyl (for example $C_1$–$C_{30}$) group); $A^3$ and $A^4$ may be combined with each other to form carboxylic anhydride. For example, the monomer (III) may be a (meth)acrylate compound.

Specific examples of the monomer (III) are as follows.

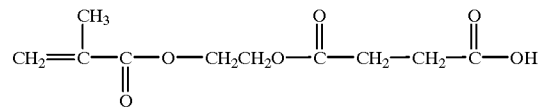
(IIIa)

(trade name: Light Ester HO-MS (manufactured by Kyoei-sha Kagaku Co., Ltd.))

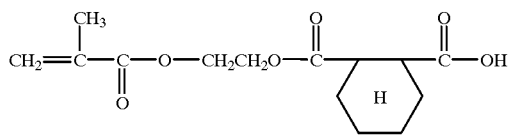
(IIIb)

(IIIb)
(trade name: Light Ester HO-HH (manufactured by Kyoei-sha Kagaku Co., Ltd.))

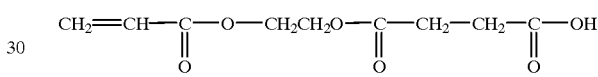
(IIIc)

(trade name: Light Ester HOA-MS (manufactured by Kyoei-sha Kagaku Co., Ltd.))

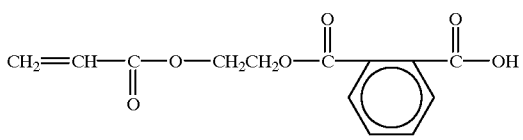
(IIId)

(trade name: Light Ester HOA-MPL (manufactured by Kyoei-sha Kagaku Co., Ltd.))

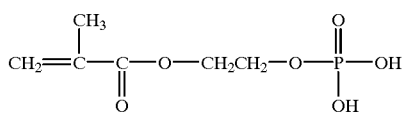
(IIIe)

(trade name: Light Ester PM (manufactured by Kyoei-sha Kagaku Co., Ltd.))

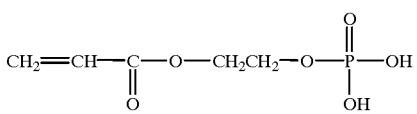
(IIIf)

(trade name: Light Ester PA (manufactured by Kyoei-sha Kagaku Co., Ltd.))

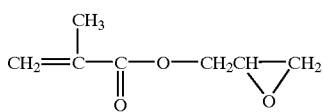

(trade name: Light Ester G (manufactured by Kyoei-sha Kagaku Co., Ltd.))

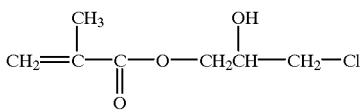

(trade name: Light Ester CL (manufactured by Kyoei-sha Kagaku Co., Ltd.))

(trade name: SZ6030 (manufactured by Toray Dow Corning Silicone Co., Ltd.))

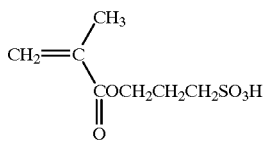

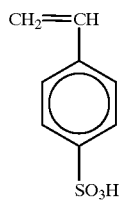

(n=1 to 20)
(Sulfonic acid-containing monomer) (IIIm)

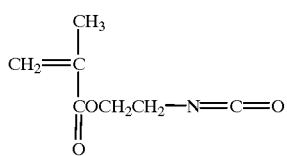

(Isocyanate group-containing monomer)

In the present invention, the other copolymerizable monomer may also be used in addition to the monomers (I) to (III). The other copolymerizable monomer may be (IV) a monomer containing no fluorine.

The other copolymerizable monomer may be a (meth) acrylate ester. Examples of the (meth)acrylate ester are 2-ethylhexyl (meth)acrylate, stearyl (meth)acrylate, cyclohexyl (meth)acrylate, poly(oxyalkylene) (meth)acrylate, 2-hydroxyethyl (meth)acrylate, benzyl (meth)acrylate, isocyanate ethyl(meth)acrylate, aziridinyl (meth)acrylate, (meth)acrylate having polysiloxane, N,N-dimethylaminoethyl (meth)acrylate and acetoacetoxyethyl (meth)acrylate.

Additional examples of the other copolymerizable monomer are ethylene, butadiene, isoprene, chloroprene, vinyl acetate, vinylidene chloride, styrene, a-methylstyrene, p-methylstyrene, (meth)acrylamide, diacetone(meth) acrylamide, methylol(meth)acrylamide, N-methylol(meth) acrylamide, vinyl alkyl ether, halogenated alkyl vinyl ether, vinyl alkyl ketone, maleic anhydride, N-vinylcarbazole and acrylonitrile.

A weight-average molecular weight of the copolymer (A) is preferably from 2,000 to 1,000,000.

The amount of the structure unit (I) is preferably from 5 to 90% by weight, more preferably from 50 to 80% by weight, the amount of the structure unit (II) is preferably from 5 to 80% by weight, more preferably from 10 to 60% by weight, the amount of the structure unit (III) is from 1 to 50% by weight, more preferably from 5 to 40% by weight, and the amount of the structure unit (IV) is preferably from 0 to 50% by weight, more preferably from 0.1 to 30% by weight, respectively, based on the copolymer (A).

The copolymer (B) comprises at least two (meth)acrylic monomers containing no fluorine. The (meth)acrylic monomer containing no fluorine may be preferably those represented by the general formula:

$$CH_2=CX^3COOX^4$$

wherein $X^3$ is a hydrogen atom or a methyl group; and $X^4$ is a linear or branched group of $C_nH_{2n+1}$ (n=1–5).

The copolymer (B) may be a copolymer of methyl methacrylate (MMA)/ethyl methacrylate (EMA).

A weight-average molecular weight of the copolymer (B) is preferably from 1,000 to 1,000,000, particularly from 100,000 to 200,000.

The amount of MMA is preferably from 40 to 95% by weight, more preferably from 75 to 85% by weight, and the amount of EMA is preferably from 5 to 60% by weight, more preferably from 15 to 25% by weight, based on the copolymer (B) of methyl methacrylate (MMA)/ethyl methacrylate (EMA).

In the composition comprising the copolymer (A) and copolymer (B), the amount of the copolymer (B) may be from 0 to 100 parts by weight, for example 0.1 to 50 parts by weight, based on 100 parts by weight of the copolymer (A).

The copolymers (A) and (B) can be produced by the solution polymerization, emulsion polymerization or suspension polymerization. Among them, the emulsion polymerization is particularly preferable.

The copolymer can be produced by the solution polymerization in an organic solvent. Examples of the organic solvent are ketones (e.g. acetone, methyl ethyl ketone and methyl isobutyl ketone), esters (e.g. ethyl acetate, propyl acetate and butyl acetate), alcohols (e.g. ethanol, isopropanol, butanol, 1,3-butanediol and 1,5-pentanediol), halogenated hydrocarbons (e.g. perchloroethylene, Trichlene (trichloroethylene), 1,1-dichloro-2,2,3,3,3-pentafluoropropane, 1,3-dichloro-1,2,2,3,3,3-pentafluoropropane and 1,1-dichloro-1-fluoroethane (HCFC-141b); hydrocarbons (e.g. octane, petroleum, toluene and xylene); dipropylene glycol, dipropylene glycol monomethyl ether, tripropylene glycol monomethyl ether, polypropylene glycol, triethylene glycol dimethyl ether, propylene glycol and ethylene glycol.

Preferable organic solvents are ketones (e.g. methyl ethyl ketone and methyl isobutyl ketone), ethyl acetate and 1,1-dichloro-1-fluoroethane.

The copolymer of the present invention can also be produced in an aqueous emulsion. The monomer is emulsion-polymerized by using water, an emulsifying agent and, if necessary, an organic solvent. Such a mixture may be polymerized after previously emulsifying by a high-pressure emulsifying machine As the emulsifying agent, various surfactants (e.g. anionic, cationic and nonionic surfactants) can be used.

Examples of the anionic surfactant include sodium lauryl sulfate, lauryl sulfate triethanolamine, sodium polyoxyethylene lauryl ether sulfate, sodium polyoxyethylene nonylphenyl ether sulfate, polyoxyethylene lauryl ether sulfate triethanolamine, sodium cocoylsarcosine, sodium N-cocoylmethyltaurine, sodium polyoxyethylene (coconut) alkyl ether sulfate, sodium diether hexylsulfosuccinate, sodium a-olefin sulfonate, sodium lauryl phosphate, sodium polyoxyethylene lauryl ether phosphate, perfluoroalkyl carboxylate salt (manufactured by Daikin Industries Ltd. under the trade name of UNIDINE DS-101 and 102).

Examples of the cationic surfactant include dialkyl ($C_{12}$–$C_{22}$)dimethylammonium chloride, alkyl(coconut) dimethylbenzylammonium chloride, octadecylamine acetate salt, tetradecylamine acetate salt, tallow alkylpropylenediamine acetate salt, octadecyltrimethylammonium chloride, alkyl(tallow)trimethylammonium chloride, dodecyltrimethylammonium chloride, alkyl(coconut) trimethylammonium chloride, hexadecyltrimethylammonium chloride, biphenyltrimethylammonium chloride, alkyl (tallow)-imidazoline quaternary salt, tetradecylmethylbenzylammonium chloride, octadecyidimethylbenzylammonium chloride, dioleyidimethylammonium chloride, polyoxyethylene dodecylmonomethylammonium chloride, polyoxyethylene alkyl($C_{12}$–$C_{22}$) benzylammonium chloride, polyoxyethylene laurylmonomethyl ammonium chloride, 1-hydroxyethyl-2-alkyl(tallow)-imidazoline quaternary salt, and a silicone cationic surfactant having a siloxane group as a hydrophobic group, a fluorine-containing cationic surfactant having a fluoroalkyl group as a hydrophobic group (manufactured by Daikin Industries Ltd. under the trade name of UNIDINE DS-202).

Examples of the nonionic surfactant include polyoxyethylene lauryl ether, polyoxyethylene tridecyl ether, polyoxyethylene cetyl ether, polyoxyethylene polyoxypropylene cetyl ether, polyoxyethylene stearyl ether, polyoxyethylene oleyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan monopalmitate, sorbitan monostearate, sorbitan monooleate, sorbitan sesquioleate, sorbitan trioleate, polyoxyethylene sorbitan monolaurate, polyoxyethylene sorbitan monopalmitate, polyoxyethylene sorbitan monostearate, polyoxyethylene sorbitan monooleate, polyoxyethylene polyoxypropylene block polymer, polyglycerin fatty acid ester, polyether-modified silicone oil (manufactured by Toray Dow Corning Silicone Co., Ltd. under the trade names of SH3746, SH3748, SH3749 and SH3771), perfluoroalkyl ethyleneoxide adduct (manufactured by Daikin Industries Ltd. under the trade names of UNIDINE DS-401 and DS-403), fluoroalkyl ethyleneoxide adduct (manufactured by Daikin Industries Ltd. under the trade name of UNIDINE DS-406), and perfluoroalkyl oligomer (manufactured by Daikin Industries Ltd. under the trade name of UNIDINE DS-451).

Examples of the organic solvent used in the emulsion polymerization are the same as those used in the solution polymerization.

In the polymerization, the polymerization initiators and/or ionizing radiations (e.g. γ-ray) may be used to initiate the polymerization. Examples of the polymerization initiator are an organic peroxide (for example, persulfate), an azo compound and a persulfate.

Examples of the persulfate include t-butyl peroxypivalate, benzoyl peroxide, lauroyl peroxide, di-t-butyl peroxide and diisopropyl peroxydicarbonate. Examples of the azo compound include 2,2'-azobisisobutyronitrile and 2,2'-azobis(2-methylbutyronitrile).

The copolymer (i.e. a copolymer (A) alone, or a mixture of the copolymer (A) and copolymer (B)) can be used as a treatment agent. The treatment agent may be a water- and oil-repellent, particularly a stainproofing agent. The treatment agent contains a copolymer and a solvent. The solvent may be water, alcohol (e.g. alkanol), ketone, ester, ether (e.g. glycol ether) or a mixture thereof. A solvent of the treatment agent may be different from that used in the polymerization. When the solvent of the treatment agent and that used in the polymerization are different, the polymerization solvent is removed (by evaporation) before using as the treatment agent.

The treatment agent of the present invention is prepared in any form such as an emulsion and a solvent solution according to a conventional method. For example, an aqueous emulsion type composition is prepared by the emulsion polymerization method as described above, and a solvent solution type composition is prepared by the solution polymerization.

The stainproofing agent can be obtained by mixing a liquid containing the copolymer (A) and a liquid containing the copolymer (B), which are separately prepared, and optionally adding a medium (e.g. water and organic solvent).

The stainproofing agent of the present invention can be applied to the surface of the material to be treated by the method which has hitherto been known. There can be normally used a method of diluting the stainproofing agent with the organic solvent or water, applying the solution to the surface of the material to be treated (e.g. carpet fabric, carpet yarn or raw cotton) by a known method (e.g. dip coating, spray coating and foam coating). If necessary, the stainproofing agent may be applied together with a suitable crosslinking agent, followed by curing. It is also possible to add other water repellents and oil repellents, and mothproofing agents, textile softeners, antimicrobial agents, flame retardants, antistatic agents, paint fixing agents, crease-proofing agents, etc. to the stainproofing agent of the present invention and to use them in combination. In case of the dip coating, the concentration of the copolymer in the dipping liquid (treatment liquid) may be from 0.05 to 10% by weight. In case of the spray coating, the concentration of the copolymer in the treatment liquid may be from 0.1 to 5% by weight. A stain blocker may be used in combination. When using the stain blocker, the anionic or nonionic emulsifying agent is preferably used.

The substrate to be treated with the stainproofing agent of the present invention is preferably a textile, particularly a carpet. Examples of the textile include animal- or vegetable-origin natural fibers such as cotton, hemp, wool and silk;

synthetic fibers such as polyamide, polyester, polyvinyl alcohol, polyacrylonitrile, polyvinyl chloride and polypropylene; semisynthetic fibers such as rayon and acetate; inorganic fibers such as glass fiber, carbon fiber and asbestos fiber; and a mixture of these fibers. The stainproofing agent of the present invention can be suitably used for carpets of nylon or polypropylene because of excellent resistance to a detergent solution and brushing (mechanical).

The textile may be in any form of, for example, fiber, yarn and cloth. When the carpet is treated with the stainproofing agent of the present invention, the carpet may be formed after treating fibers or yarns with the stainproofing agent, or the formed carpet may be treated with the stainproofing agent of the present invention. Examples of the substrate to be treated with the stainproofing agent of the present invention include glass, paper, wood, hide, fur, asbestos, brick, cement, metal and oxide, ceramics, plastic, coated surface and plaster, in addition to the textile.

PREFERRED EMBODIMENTS OF THE INVENTION

The present invention will be illustrated by the following Examples which do not limit the present invention. The parts represent parts by weight unless otherwise specified.

The stainproofing agents obtained in the Examples and Comparative Examples were evaluated as follows. Each polymer liquid obtained in the Examples and Comparative Examples is diluted with water to prepare a liquid with a solid content of 3%, which is used as a treatment liquid. This treatment liquid is sprayed on a nylon loop-pile carpet fabric (non-backed product) so that a treatment amount is 100 g/m², and the treated carpet fabric is dried with heating at 130° C. for 7 minutes. The water repellency, oil repellency and stainproofing properties before and after cleaning test are evaluated.

The water repellency and oil repellency shown in the Examples and Comparative Examples are expressed as follows. That is, the water repellency is expressed by the water repellency No. (cf. the following Table 1) determined by the spray method according to JIS (Japanese Industrial Standard)-L-1092. The oil repellency is determined by dropping one drop (diameter: about 5 mm) of a test solution shown in Table 2 on the surface of a test cloth and observing the penetration state of the drop after 30 seconds (AATCC-TM118-1966).

TABLE 1

| Water-repellency No. | State |
| --- | --- |
| 100 | No wet on the surface |
| 90 | Slight wet on the surface |
| 80 | Partial wet on the surface |
| 70 | Wet on the surface |
| 50 | Wet over the whole surface |
| 0 | Complete wet on the front and back surfaces |

TABLE 2

| Oil-repellency | Test solution | Surface tension (dyne/cm, 25° C.) |
| --- | --- | --- |
| 8 | n-Heptane | 20.0 |
| 7 | n-Octane | 21.3 |
| 6 | n-Decane | 23.5 |
| 5 | n-Dodecane | 25.0 |
| 4 | n-Tetradecane | 26.7 |

TABLE 2-continued

| Oil-repellency | Test solution | Surface tension (dyne/cm, 25° C.) |
| --- | --- | --- |
| 3 | n-Hexadecane | 27.3 |
| 2 | n-Hexadecane/Nujol (35/65 by weight) | 29.6 |
| 1 | Nujol | 31.2 |
| 0 | Inferior to 1 | |

The stainproof test was conducted according to JIS-L-1021-1979. First, a carpet is stained with a dry soil having the composition shown in Table 3 according to JIS-L-1021-1979.

TABLE 3

| Component | Weight ratio (%) |
| --- | --- |
| Peat moss | 38 |
| Portland cement (JIS R 5210) | 17 |
| White clay (JIS K 8746) | 17 |
| Diatomaceous earth (JIS K 8330) | 17 |
| Carbon black (JIS K 5107) | 1.75 |
| Iron (III) oxide for ferrite (JIS K 1462) | 0.5 |
| Nujol | 8.75 |

After the excess dry soil on the surface is sucked with an electrical cleaner, the brightness of the surface is measured by a colorimeter and a stain degree is calculated from the following equation, which is taken for evaluation of dry soiling stainproof properties.

$$\text{Stain degree } (\%) = [(L_0 - L)/L_0] \times 100$$

wherein $L_0$: brightness before staining, L: brightness after staining.

The cleaning test was conducted according to the method described in JIS-L-1021-1979. The water- and oil-repellency as well as stainproof properties before and after cleaning were evaluated.

The preparation of the monomer having a urethane linkage is shown in Preparative Example 1.

Preparative Example 1 (Preparation of product U1)

In a flask equipped with a stirrer, a thermometer, a reflux condenser and a dropping funnel, 348 g of 2,4-tolylene diisocyanate was dissolved in 348 g of methyl isobutyl ketone (MIBK) and the solution was heated to 80° C. while stirring and purging with nitrogen. When the temperature reached 80° C., two drops of dibutyltin laurate were added and, at the same time, dropwise addition of 2-ethylhexyl alcohol (260 g) was initiated and continued slowly over 2 hours. After the completion of the dropwise addition, 260 g of 2-hydroxyethyl methacrylate was added dropwise, slowly, over 2 hours. After the completion of the dropwise addition, the stirring was continued at 80° C. for 2 hours. Then, MIBK was distilled off under reduced pressure to obtain 868 g of a yellow transparent viscous liquid. IR revealed that —NCO group completely disappeared, and $^1$H-NMR and $^{13}$C—NMR revealed disappearance of —OH, formation of a urethane linkage and existence of a double bond. This product is referred to as U1.

A chemical structure of the product U1 is considered as follows.

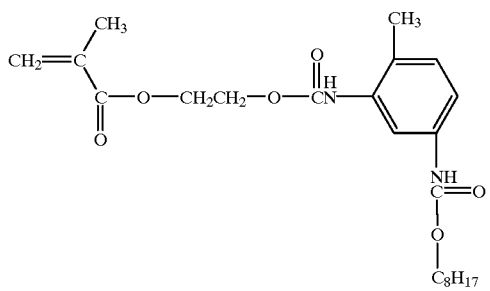

Preparative Example 2 (Preparation of product U2)

In a flask equipped with a stirrer, a thermometer, a reflux condenser and a dropping funnel, 174 g of 2,4-tolylene diisocyanate was dissolved in 300 g of MIBK and the solution was heated to 80° C. while stirring and purging with nitrogen. When the temperature reached 80° C., two drops of dibutyltin laurate were added and, at the same time, dropwise addition of 2-(perfluoro-7-methyloctyl)ethanol (514 g) was initiated and continued slowly over 2 hours. After the completion of the dropwise addition, 130 g of 2-hydroxyethyl methacrylate was added dropwise, slowly, over 2 hours. After the completion of the dropwise addition, the stirring was continued at 80° C. for 2 hours. Then, MIBK was distilled off under reduced pressure to obtain 818 g of a viscous liquid. IR revealed that —NCO group completely disappeared, and $^1$H-NMR and $^{13}$C-NMR revealed disappearance of —OH, formation of a urethane linkage and existence of a double bond. This product is referred to as U2.

A chemical structure of the product U2 is considered as follows.

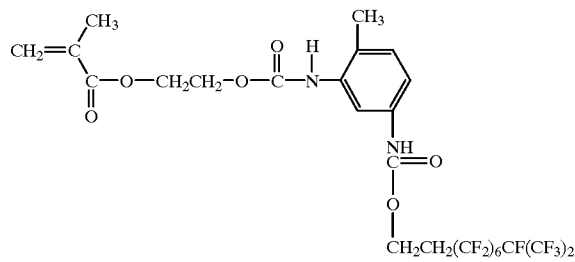

Preparative Example 3

In a flask equipped with a stirrer, a thermometer and a reflux condenser, 36 g of a monomer I (fluorine-containing acrylate) shown in Table 4, 18 g of U1 (urethane linkage-containing monomer) synthesized in Preparative Example 1 and 6 g of a monomer 11 (functional group-containing monomer) shown in Table 4 were charged and then dissolved in 240 g of MIBK. The solution was heated to 80° C. while stirring and purging with nitrogen.

At one hour after the beginning of purging with nitrogen, it was confirmed that the inner temperature was 80° C.. Then, 1.2 g of AIBN (azobisisobutyronitrile) was added and the polymerization was initiated.

At eight hours after the beginning of the polymerization, a gas chromatography analysis revealed that 99% of the monomer I was polymerized. A liquid having a solid content of 20% was obtained. A GPC (gel permeation chromatography) analysis revealed that this solid content has a weight-average molecular weight of 30,000 (in terms of polystyrene).

TABLE 4

| | |
|---|---|
| Monomer I | $CH_2=\overset{H}{\underset{}{C}}-\overset{O}{\underset{\|}{C}}-O-CH_2CH_2-C_8F_{17}$ |
| Monomer II | $CH_2=\overset{CH_3}{\underset{}{C}}-\overset{O}{\underset{\|}{C}}-O-CH_2CH_2O-\overset{O}{\underset{\|}{C}}-CH_2CH_2\overset{O}{\underset{\|}{C}}-OH$ |
| Monomer III | $CH_2=\overset{CH_3}{\underset{}{C}}-\overset{O}{\underset{\|}{C}}-O-CH_2CH_2O-\overset{O}{\underset{OH}{P}}-OH$ |
| Monomer IV | $CH_2=\overset{CH_3}{\underset{}{C}}-\overset{O}{\underset{\|}{C}}-O-CH_2\underset{OH}{CH}-CH_2-Cl$ |

Preparative Examples 4 and 5

A combination of fluorine-containing acrylate (monomer I shown in Table 4), a urethane linkage-containing monomer (U1 synthesized in Preparative Example 1) and functional group-containing monomers (monomers III and IV shown in Table 4) shown in Table 5 was polymerized in the same manner as in Preparative Example 3.

TABLE 5

| Preparative Example | A Fluorine-containing monomer | B Urethane linkage-containing monomer | C Functional group-containing monomer | Weight ratio A/B/C | Molecular weight |
|---|---|---|---|---|---|
| 3 | I | U1 | II | 60/30/10 | 30,000 |
| 4 | I | U1 | III | 60/30/10 | 30,000 |
| 5 | I | U1 | IV | 60/30/10 | 30,000 |

Preparative Examples 6 to 8

A combination of U2 (methacrylate having a fluoroalkyl group and a urethane linkage synthesized in Preparative Example 2) and a functional group-containing monomer shown in Table 6 was polymerized in the same manner as in Preparative Example 3.

TABLE 6

| Preparative Example | A Fluorine/urethane linkage-containing monomer | B Functional group-containing monomer | Weight ratio A/B | Molecular weight |
|---|---|---|---|---|
| 6 | U2 | II | 90/10 | 30,000 |
| 7 | U2 | III | 90/10 | 30,000 |
| 8 | U2 | IV | 90/10 | 30,000 |

Comparative Preparative Example 1

36 g of a monomer I (fluorine-containing acrylate) shown in Table 4 and 24 9 of U1 (urethane linkage-containing monomer) synthesized in Preparative Example 1 were polymerized in the same manner as in Preparative Example 3 (see Table 7).

Comparative Preparative Example 2

54 g of a monomer I (fluorine-containing acrylate) shown in Table 4 and 6 g of a monomer 11 (functional group-containing monomer) shown in Table 4 were polymerized in the same manner as in Preparative Example 3 (see Table 7).

TABLE 7

| Comparative Preparative Example | A Fluorine-containing monomer | B Urethane linkage-containing monomer | C Functional group-containing monomer | Weight ratio A/B/C | Molecular weight |
|---|---|---|---|---|---|
| 1 | I | U1 | — | 60/40/0 | 30,000 |
| 2 | I | — | II | 90/0/10 | 30,000 |

Comparative Preparative Example 3

60 g of U2 (methacrylate containing fluoroalkyl group and a urethane linkage which was synthesized in Preparative Example 2) was polymerized in the same manner as in Preparative Example 3 (see Table 8).

TABLE 8

| Comparative Preparative Example | A Fluorine/urethane linkage-containing monomer | B Functional group-containing monomer | Weight ratio A/B | Molecular weight |
|---|---|---|---|---|
| 3 | U2 | — | 100/0 | 30,000 |

Examples 1 to 6 and Comparative Examples 1 to 3

Using liquids obtained in Preparative Examples 3 to 8 and Comparative Preparative Examples 1 to 3 as a treatment liquid as described above, the water repellency, oil repellency and stainproof properties were evaluated before and after cleaning. The results are shown in Table 9.

EFFECT OF THE INVENTION

The copolymer of the present invention shows excellent water- and oil-repellency, and its performance is maintained even after cleaning.

What is claimed is:
1. A copolymer comprising:
   (I) 5 to 80% by weight, based on the copolymer, of a structure unit derived from a monomer which has a fluoroalkyl group and optionally has a urethane or urea linkage,
   (II) about 30 to 80% by weight, based on the copolymer, of a structure unit derived from a monomer which contains no fluorine and has at least one urethane or urea linkage and one carbon-carbon double bond, and
   (III) 1 to 50% by weight, based on the copolymer, of a structure unit derived from a monomer which has a carbon-carbon double bond and a functional group selected from the group consisting of a carboxyl group, a carboxylic anhyride group, an epoxy group, a phosphoric group, an alkoxysilane group, an imine group, a sulfonic group, an imino group, an isocyanate group and a blocked adduct thereof and a chlorine atom,
   wherein the monomer constituting the structure unit (III) is other than (meth)acrylic acid, glycidyl (meth)acrylate, vinyl chloride and vinylidene chloride.
2. The copolymer according to claim 1, further comprising (IV) a structure unit derived from a monomer containing no fluorine, in addition to the structure units (I) to (III).
3. The copolymer according to claim 1, wherein the monomer constituting the structure unit (I) is represented by the general formula:

$$Rf—R^1—OCOC(R^2)=CH_2$$

wherein Rf is a linear or branched fluoroalkyl group having 3 to 20 carbon atoms;
$R^1$ is a linear or branched alkylene group having 1 to 20 carbon atoms, a group of —CON($R^3$)—$R^4$—, a group of —SO$_2$N($R^3$)$R^4$— or a group of —CH$_2$CH(OR$^5$)CH$_2$— ($R^3$ is a lower alkyl group having 1 to 10 carbon atoms; $R^4$ is a linear or branched alkylene group having 1 to 10 carbon atoms; and $R^5$ is a hydrogen atom or an acyl group having 1 to 10 carbon atoms); and

TABLE 9

| | | Before cleaning | | | After cleaning | | |
|---|---|---|---|---|---|---|---|
| Example | Preparative Example | Water repellency | Oil repellency | Stainproof properties | Water repellency | Oil repellency | Stainproof properties |
| 1 | 3 | 60 | 5 | 18 | 60 | 5 | 16 |
| 2 | 4 | 60 | 5 | 18 | 60 | 5 | 18 |
| 3 | 5 | 60 | 5 | 18 | 60 | 5 | 18 |
| 4 | 6 | 60 | 5 | 18 | 60 | 5 | 18 |
| 5 | 7 | 60 | 5 | 18 | 60 | 5 | 18 |
| 6 | 8 | 60 | 5 | 18 | 60 | 5 | 18 |
| Comparative Example | Comparative Preparative Example | | | | | | |
| 1 | 1 | 60 | 4 | 18 | 10 | 2 | 35 |
| 2 | 2 | 60 | 4 | 25 | 10 | 2 | 35 |
| 3 | 3 | 60 | 4 | 18 | 10 | 2 | 35 |

$R^2$ is a hydrogen atom or a methyl group, or the general formula:

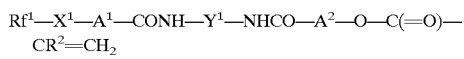

wherein $Rf^1$ is a fluoroalkyl group having 4 to 16 carbon atoms; $X^1$ is $-R^6-$, $-CON(R^3)-R^4-$ or $-SO_2N(R^3)-R^4-$ ($R^6$ is an alkylene group; $R^3$ is a hydrogen atom or a lower alkyl group; $R^4$ is an alkylene group); $A^1$ is $-O-$, $-S-$ or $-N(R^3)-$ ($R^3$ is a hydrogen atom or a lower alkyl group); $Y^1$ is a residue wherein isocyanate is removed from an aromatic or alicyclic diisocyanate; $A^2$ is a divalent organic group capable of having 2 to 9 carbon atoms and at least one oxygen atom; and $R^2$ is a hydrogen atom or a methyl group.

4. The copolymer according to claim 1, wherein the monomer constituting the structure unit (II) is a monomer obtained by reacting:

(II-A) a compound having at least two isocyanate groups, (II-B) a compound having one carbon-carbon double bond and at least one hydroxyl or amino group, and (II-C) a compound having one hydroxyl or amino group.

5. The stainproof agent which contains the copolymer according to claim 2, wherein the monomer constituting the structure unit (III) is vinyl chloride or a compound represented by the general formula:

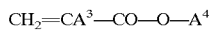

wherein $A^3$ is a hydrogen atom, an alkyl group or a group of $-CH_2COOH$; and $A^4$ is a hydrogen atom, $-A^5-X^2$ ($A^5$ is a direct bond or an alkylene group; and $X^2$ is a carboxyl group, an epoxy group, a phosphoric group, an alkoxysilane group, an amino group or a residue wherein one hydrogen is removed from one carboxyl group of a dicarboxylic acid), a sulfonic group, an isocyanate group or $-CH_2-C(OA^6)H-CH_2-Cl$ ($A^6$ is a hydrogen atom or an acyl group); $A^3$ and $A^4$ may be combined with each other to form carboxylic anhydride.

6. The copolymer according to claim 2, wherein the monomer constituting the structure unit (IV) is an acrylate ester represented by the general formula:

$$CH_2=CA^7COOA^8$$

wherein $A^7$ is a hydrogen atom or a methyl group; and $A^8$ is an alkyl group represented by $C_nH_{2n+1}$ (n=1-30), and/or vinyl chloride, vinylidene chloride, ethylene, vinyl acetate, acrylonitrile, styrene, vinyl alkyl ether or isoprene.

7. The copolymer according to claim 2, wherein the amount of the structure unit (I) is from 5 to 80% by weight, the amount of the structure unit (II) is from about 30 to 80% by weight, the amount of the structure unit (III) is from 1 to 50% by weight, and the amount of structure unit (IV) is from 0 to 50% by weight, respectfully, based on the copolymer.

8. A composition comprising (A) the copolymer of claim 1 and (B) an acrylic copolymer containing no fluorine.

9. The composition according to claim 8, wherein the copolymer (B) is derived from at least two (meth)acrylic monomers containing no fluorine, and the (meth)acrylic monomer containing no fluorine is represented by the general formula:

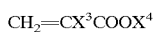

wherein $X^3$ is a hydrogen atom or a methyl group; and $X^4$ is a linear or branched group of $C_nH_{2n+1}$ (n=1-5).

10. A stainproof agent comprising (A) the copolymer of claim 1, (B) an acrylic copolymer containing no fluorine, if necessary, and (C) a solvent.

11. The stainproof agent according to claim 10, which is in the form of a solution an emulsion or an aerosol.

12. A method o treating an object to be treated, using the stainproof agent of claim 10.

13. A textile which is treated with the stainproof agent of claim 10.

14. A carpet which is treated with the stainproof agent of claim 10.

15. A copolymer comprising:

(I) 5 to 80% by weight, based on the copolymer, of a structure unit derived from a monomer which has a fluoroalkyl group and optionally has a urethane or urea linkage, (II) about 30 to 80% by weight, based on the copolymer, of a structure unit derived from a monomer which contains no fluorine and has at least one urethane or urea linkage and one carbon-carbon double bond, and (III) 1 to 50% by weight, based on the copolymer, of a structure unit derived from a monomer selected from the group consisting of:

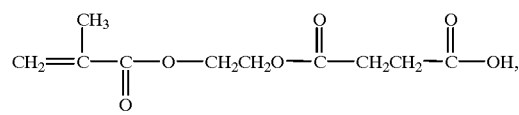
(IIIa)

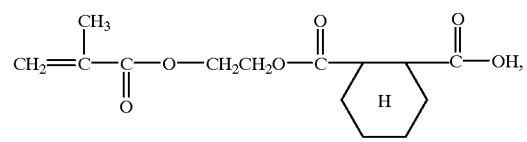
(IIIb)

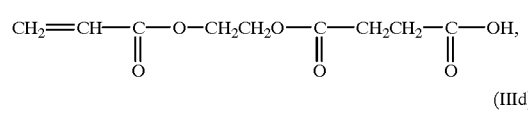
(IIIc)

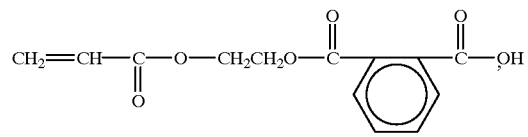
(IIId)

-continued
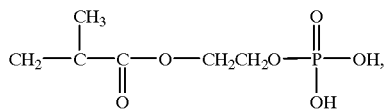 (IIIe)
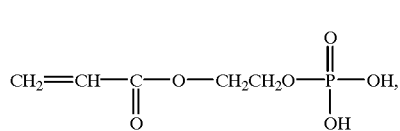 (IIIf)
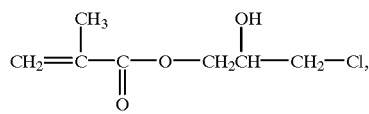 (IIIh)
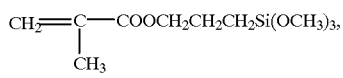 (IIIi)
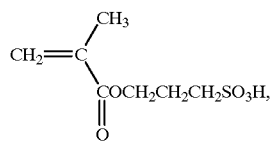 (IIIj)
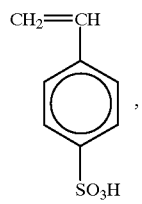 (IIIk)
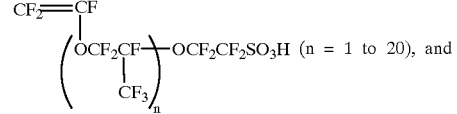 (IIIl)
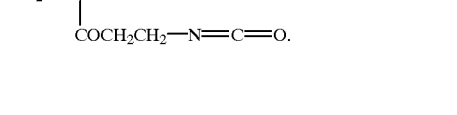 (IIIm)
* * * * *